(12) United States Patent
Minamitani et al.

(10) Patent No.: US 7,242,581 B2
(45) Date of Patent: Jul. 10, 2007

(54) LIQUID COOLING SYSTEM AND AN ELECTRONIC APPARATUS APPLYING THE SAME THEREIN

(75) Inventors: Rintaro Minamitani, Tsukuba (JP); Shinji Matsushita, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 318 days.

(21) Appl. No.: 11/023,527

(22) Filed: Dec. 29, 2004

(65) Prior Publication Data

US 2006/0039112 A1 Feb. 23, 2006

(30) Foreign Application Priority Data

Aug. 20, 2004 (JP) .............................. 2004-240630

(51) Int. Cl.
*H05K 7/20* (2006.01)

(52) U.S. Cl. ...................... 361/699; 165/80.3; 165/46; 174/15.1

(58) Field of Classification Search ...................... None
See application file for complete search history.

(56) References Cited

U.S. PATENT DOCUMENTS

| | | | | |
|---|---|---|---|---|
| 4,155,402 A | * | 5/1979 | Just .............................. | 165/46 |
| 5,251,100 A | * | 10/1993 | Fujita et al. ................. | 361/719 |
| 5,572,538 A | * | 11/1996 | Saitoh et al. ................. | 372/34 |
| 5,795,102 A | * | 8/1998 | Corbishley ................... | 405/171 |
| 2005/0007730 A1 | * | 1/2005 | Ohashi et al. .............. | 361/683 |
| 2005/0047091 A1 | * | 3/2005 | Minamitani et al. ........ | 361/702 |
| 2005/0117298 A1 | * | 6/2005 | Koga et al. .................. | 361/699 |

FOREIGN PATENT DOCUMENTS

| | | |
|---|---|---|
| JP | 05-335454 | 12/1993 |
| JP | 06-097338 | 4/1994 |
| JP | 06-125188 | 5/1994 |
| JP | 06-266474 | 9/1994 |
| JP | 10-213370 | 8/1998 |
| JP | 2003-185321 | 7/2003 |

* cited by examiner

*Primary Examiner*—Greg Thompson
(74) *Attorney, Agent, or Firm*—Antonelli, Terry, Stout & Kraus, LLP

(57) ABSTRACT

A liquid cooling system, enabling protection from corrosion due to liquid coolant for a long time-period (5–10 years) while cooling a heat-generation body effectively, comprises a pump 108, a heat-receiving jacket 107, a radiator for radiating heat into an outside, being made up with a heat-radiation pipe 201 and a heat-radiation plate 202, and further a tank 203 for accumulating the liquid coolant 209 within an inside thereof, wherein those are connected in a closed-loop, so as to circulating the cooling liquid therein, thereby cooling the heat-generation of a CPU 106, being a heat-generation element, effectively, through the heat-receiving jacket 107, and further a water-permeable bag 204 is disposed in a portion of flow path of the cooling liquid, which receives microcapsules 10 therein, each enclosing in an inside thereof anti-corrosion agent 20 for suppressing the corrosion due to the cooling liquid, including such as, a water, etc.

20 Claims, 12 Drawing Sheets

FIG.21
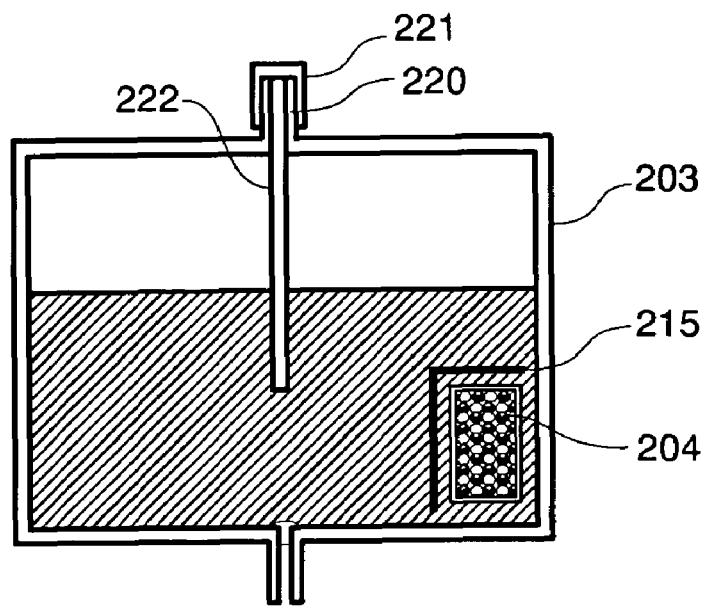
FIG.22(a)    FIG.22(b)
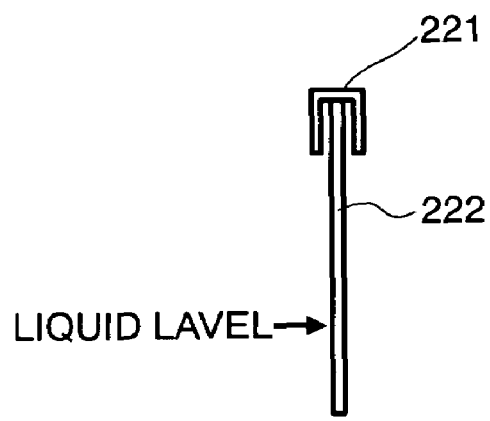
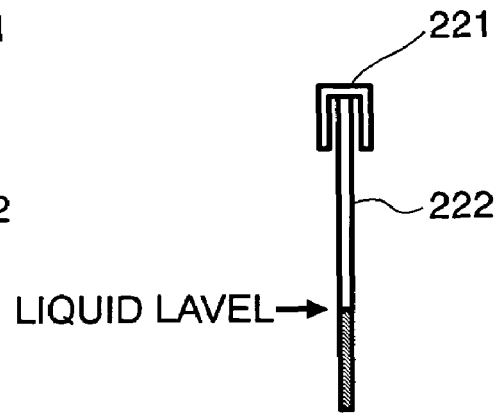

FIG.24(a) FIG.24(b) FIG.24(c)

LIQUID COOLING SYSTEM AND AN ELECTRONIC APPARATUS APPLYING THE SAME THEREIN

BACKGROUND OF THE INVENTION

The present invention relates to a liquid cooling system, being suitable for use within an electronic apparatus, including such as a notebook-type personal computer, for example, and further a desktop-type personal computer, a home server, a projector, and a media storage, etc., wherein cooling can be achieved, effectively, through the liquid cooling, and further relates to an electronic apparatus using the liquid cooling system therein.

A semiconductor element, which is applied within the electronic apparatus, such as, the computer or the likes mentioned above, in particular, a CPU, generating heat when it operates, as being a representative one of such the semiconductor elements. In particular, in recent years, due to demands for high speed of processing and/or high capacity, upon such the semiconductor elements, a value of heat-generation therefrom is in a tendency of increasing, more and more. Since such the semiconductor element loses the functions thereof, remarkably, when the temperature thereof exceeds a predetermined value, in general; therefore, in particular, with such the semiconductor element having a large heat-generation value, there is a necessity of providing a means for cooling, actively or aggressively. Conventionally, as a technology for cooling down the semiconductor element in such the electronic apparatus, various ones are already known and/or proposed, such as, through heat conduction, air cooling, applying a heat pipe therein, and further applying a liquid coolant or refrigerant therein.

Among of those technologies for cooling down such the semiconductor element, a one of cooling with applying the liquid cooling is most effective, in particular, for the semiconductor element having the large heat-generation, such as, the CPU mentioned above, for example, representatively. Further, a cooling method of applying such the liquid cooling therein is also already described and known in the details thereof, in the following Patent Documents 1 through 4. However, the cooling methods relating to those conventional arts are limited, in particular, only to a use in a large-scaled computer (or, so-called a mainframe).

A reason thereof lies in that the liquid cooling apparatus comes to be large in the sizes, because such the liquid cooling system relating to the conventional arts mentioned above needs a large number of parts, which are exclusive use for the liquid cooling, such as, a pump, a piping system, a radiator, etc., and further, in that it is difficult to maintain the reliability of using a liquid for cooling, comparing to other cooling method. In addition thereto, there can be also pointed out other reason that, the semiconductor element, having such a large heat-generation of a degree of necessitating the liquid cooling therein, was hardly applied therein, other than the field of the large-scaled computer, in the conventional arts.

On the other hand, differing from such the large-scaled computer as was mentioned above, a technology of applying the liquid cooling system within a small-size electronic apparatus is described and is already know in the following Patent Document 5, for example. In more details thereof, this conventional art relates to an apparatus, in which the cooling is obtained by running a liquid therein while connecting between a heat-receiving jacket attached with the semiconductor thereon and a radiator located at a position separated from it, through so-called flexible tubes.

In addition thereto, there is also know a cooling apparatus for cooling an electric equipment, such as, a thyristor or an inverter or the like, wherein a pure water having high dielectric strength is applied as the cooling water, for the purpose of preventing an accident of short-circuit from causing between the electrodes thereof, in particular, due to lowering of the dielectric strength if applying a running tap water (or, a city water) or a water for industrial use, etc., in the place thereof, into which a large amount of electrically conductive materials dissolves therein, and also where an ion-exchange resin is provided within a pure-water tank for maintaining high purity of the pure water, for example, in the following Patent Document 6.

Patent Document 1: Japanese Patent Laying-Open No. Hei 5-335454 (1993);

Patent Document 2: Japanese Patent Laying-Open No. Hei 6-97338 (1994);

Patent Document 3: Japanese Patent Laying-Open No. Hei 6-125188 (1994);

Patent Document 4: Japanese Patent Laying-Open No. Hei 10-213370 (1998);

Patent Document 5: Japanese Patent Laying-Open No. Hei 6-266474 (1994);

Patent Document 6: Japanese Patent Laying-Open No. 2003-185321 (2003).

However, as was mentioned above, the heat-generation goes up, every year, of the semiconductor element, being the heat-generation parts to be used within those electronic apparatuses, as such, the personal computer, the home server, the projector, and the media storage, etc., in particular, in recent years, and therefore, the cooling comes to be insufficient, obtained by means of such the air-cooling using the heat-conduction and/or a forced circulation air-cooling of the conventional arts, or the cooling through the heat pipe, only.

Then, an attention is paid upon the technology described in the Patent Document 5 mentioned above, and with this technology, a case of the personal computer is made of a metal material having superior heat-conductivity, so that the case itself can be utilized to be a heat-radiation plate, thereby enabling the personal computer to receive the liquid cooling system within the case thereof.

However, installing such the liquid cooling system of using the liquid coolant or refrigerant into an inside of the personal computer further causes a new problem. Namely, within the liquid cooling system to be applied into such the personal computer, an amount of the coolant or refrigerant is very small, such as, the water, typically, which can be held within an inside thereof (i.e., about $\frac{1}{1,000}$ in the amount, comparing to that of the cooling liquid that is used within the large-scaled computer), and in addition thereto, further the working temperature thereof is relatively high. For this reason, if corrosive ion dissolves from a portion in contact with the coolant or refrigerant, even in a small amount thereof, in particular, from the parts made of organic materials (i.e., parts made of synthetic resin), then due to that corrosive ion, the liquid quality of the cooling liquid, being small in the amount thereof, is easily degraded as a whole; i.e., there is a problem that corrosion is promoted, in particular, upon the parts made of the metal materials, such as, the heat-receiving jacket and/or the radiator, etc. And further, such the problem is fatal, in particular, for the liquid cooling system to be applied within the electronic apparatus, including the personal computer therein, since it is desirable that those parts, including piping portions therein, are made of the metal materials as far as they can, for the purpose of lowering leakage of the liquid coolant or refrigerant held within the inside, through vaporization thereof, and thereby maintaining the cooling operation for a long time-period (for example, around 5–10 years as a term of guarantee). Moreover, in a case if causing the water leakage due to such the corrosion, it also causes an important problem, such as, that the functions of the electronic apparatus are stopped, or the like; therefore, it is indispensable to apply a countermeasure for the corrosion control (or, an anticorrosive means) upon the parts, which are in contact with the cooling liquid.

SUMMARY OF THE INVENTION

Then, an object is, according to the present invention, by taking the problems within such the conventional arts as was mentioned above into the consideration, and in more details thereof, to provide a liquid cooling system, being applicable to the electronic apparatus, easily, which includes a material dissolving the corrosive ion in a part thereof, such as, the personal computer or the like, for example, while enabling to maintain the corrosion resistance thereof for a long time-period (for example, the term of guarantee: 5–10 years), with certainty, thereby being able to operate, safely, but irrespective of use of the liquid coolant or refrigerant therein, and further, to provide an electronic apparatus applying the same therein.

According to the present invention, for accomplishing the above objects, first of all, there is provided a liquid cooling system for an electronic apparatus, comprising: a pump for driving a cooling liquid; a heat-receiving jacket for receiving heat from a heat-generating electronic part and for transferring the heat to the cooling liquid, which is supplied from said pump; a radiator being supplied with the cooling liquid from said heat-receiving jacket, for radiating the heat into an outside; and a flow path being provided, for circulating said cooling liquid among said radiator, said pump and said heat-receiving jacket, wherein a water-permeable bag-like material receiving therein microcapsules, each of which encloses a corrosion inhibitor within an inside thereof, is disposed in a part of the flow path of said cooling liquid, under condition of being in contact with said cooling liquid.

Also, according to the present invention, in the liquid cooling system for an electronic apparatus as mentioned above, preferably, said microcapsule has a diameter from several-tens µm to several-hundreds µm, or wherein those members building up said liquid cooling system are made of either one of copper and aluminum, and said anti-corrosion agent is an anti-corrosion agent of copper, and said anti-corrosion agent of copper is a derivative of benzotriazol. Or, preferably, those members building up said liquid cooling system are made of either one of copper and aluminum, and said anti-corrosion agent is an anti-corrosion agent of aluminum, and said anti-corrosion agent of aluminum includes either one of phosphoric acid, boric acid, silica acid, benzoic acid, and a salt thereof.

Also, according to the present invention, the liquid cooling system for an electronic apparatus as mentioned above, preferably, further comprises a corrosion sensor for detecting a condition of corrosion due to said cooling liquid within said liquid cooling system, or it further comprises a tank for accumulating a part of the cooling liquid circulating within said liquid cooling system in an inside thereof, and said corrosion sensor is provided in a part of said tank. And, preferably, in the liquid cooling system for an electronic apparatus as mentioned above, an ion-exchange resin is applied therein, in combination.

And, according to the present invention, there is also provided an electronic apparatus, comprising the above-mentioned liquid cooling system therein, and a heat-generating semiconductor element installed within said electronic apparatus, which is attached on said heat-receiving jacket under condition of being in contact therewith. Further, preferably, said electronic apparatus is either one of a desk-top type personal computer, a home server, a projector and a media storage. And further, according to the present invention, preferably, said electronic apparatus mentioned above is a notebook-top type personal computer, having a main body installing said heat-generating semiconductor element within an inside thereof, and a display portion comprising a plate-type display in a part thereof, and said radiator is provided in a part of said display portion.

BRIEF DESCRIPTION OF THE VARIOUS VIEWS OF THE DRAWING

Those and other objects, features and advantages of the present invention will become more readily apparent from the following detailed description when taken in conjunction with the accompanying drawings wherein.

Figure 4:
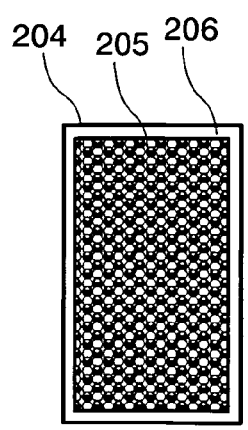
Figure 5:
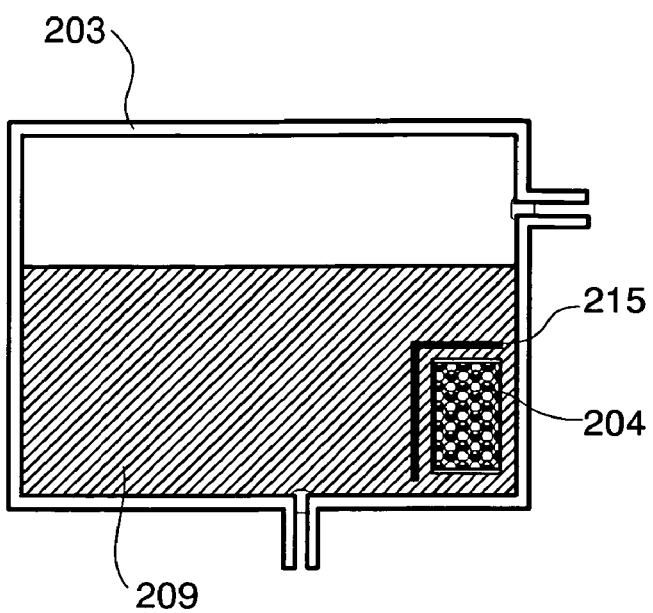
Figure 6:
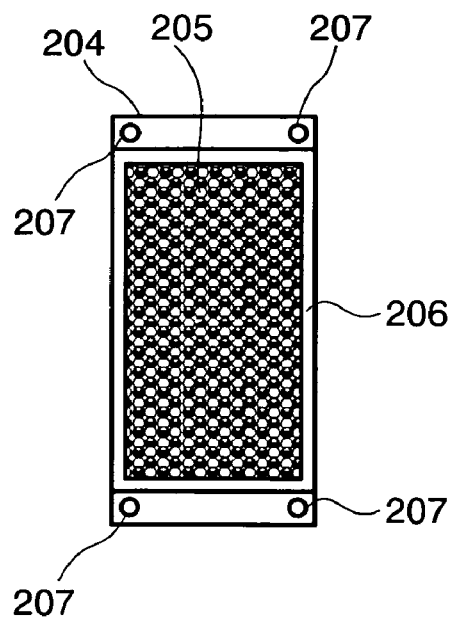
Figure 7:
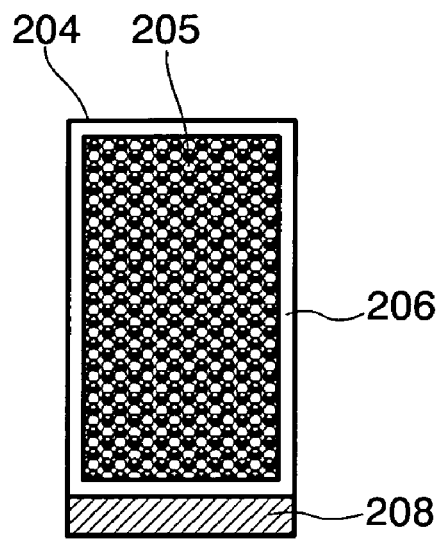
Figure 8:
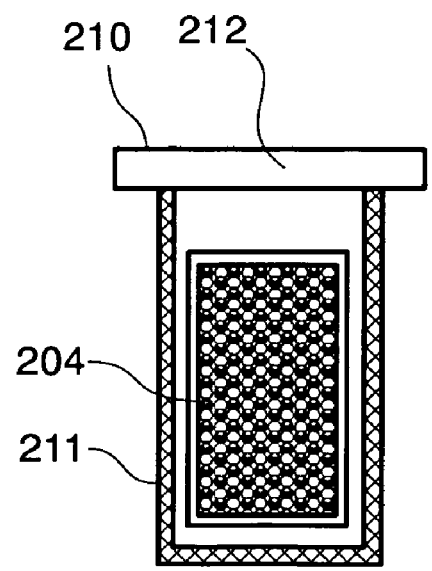
Figure 9:
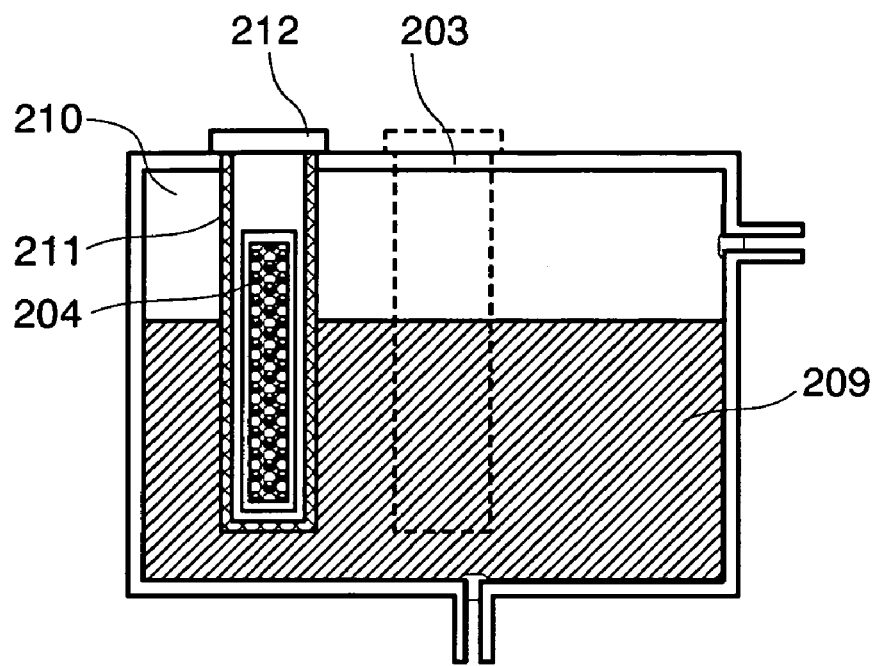
Figure 10:
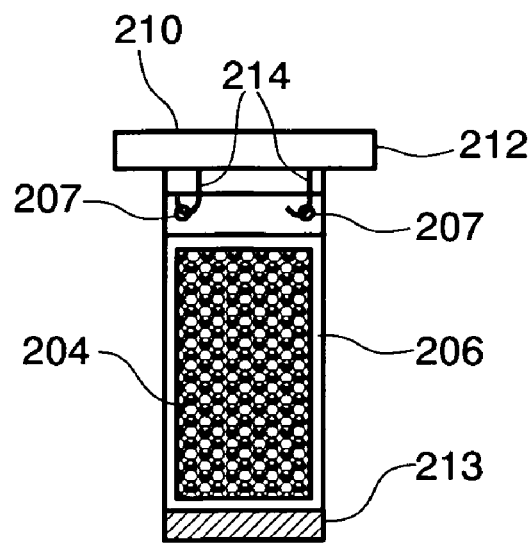
Figure 11:
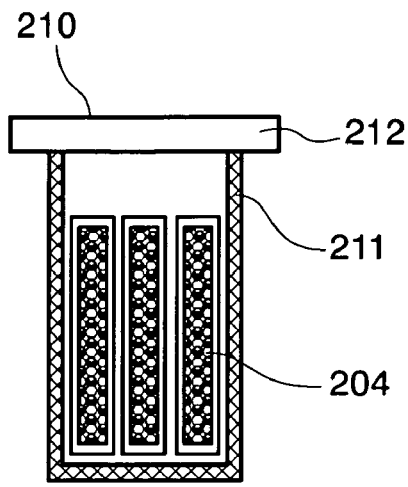
Figure 12:
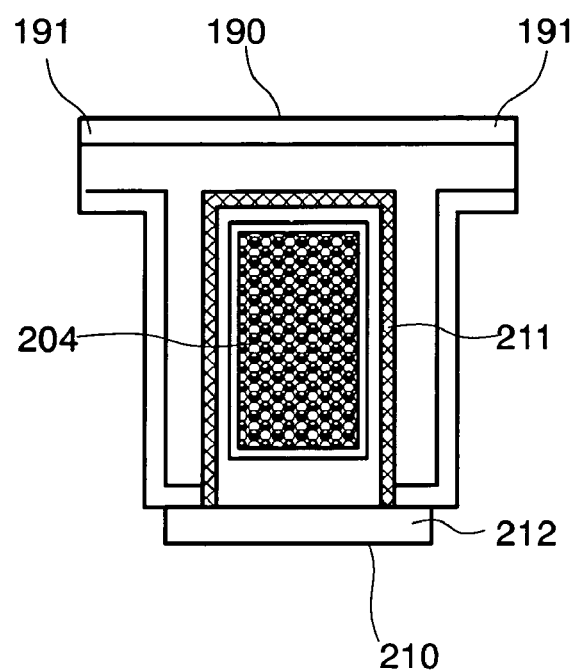
Figure 13:
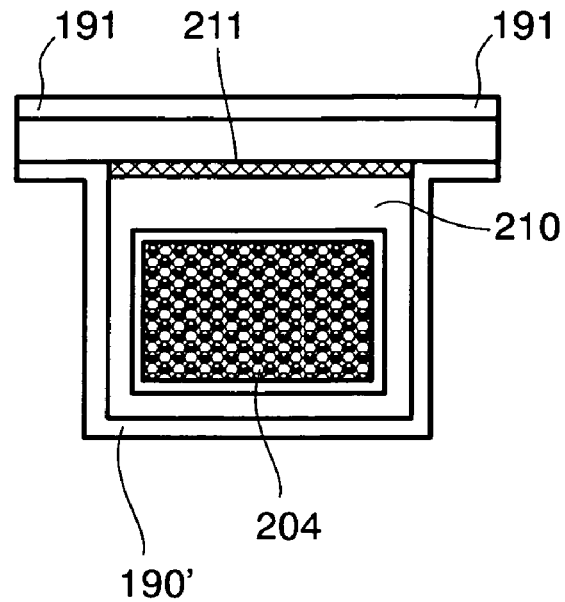
Figure 14:
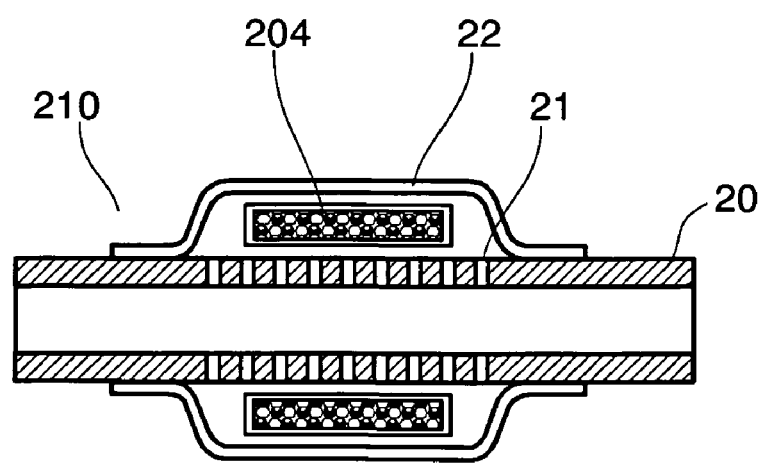
Figure 15:
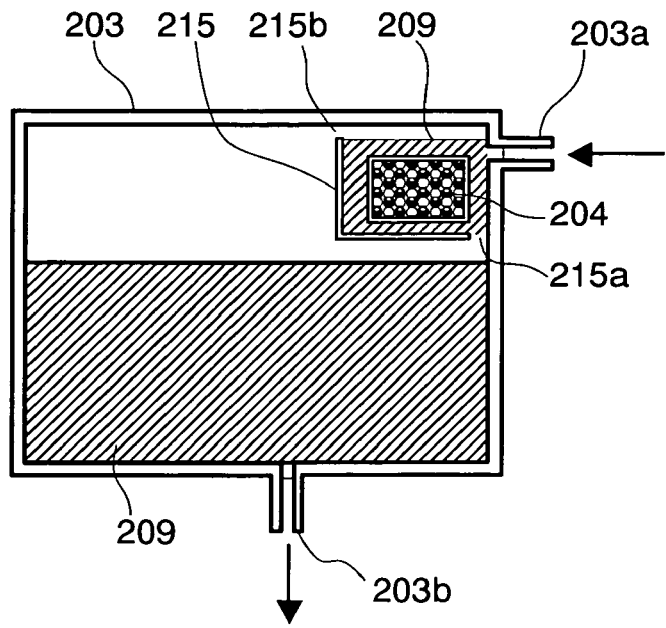
Figure 16:
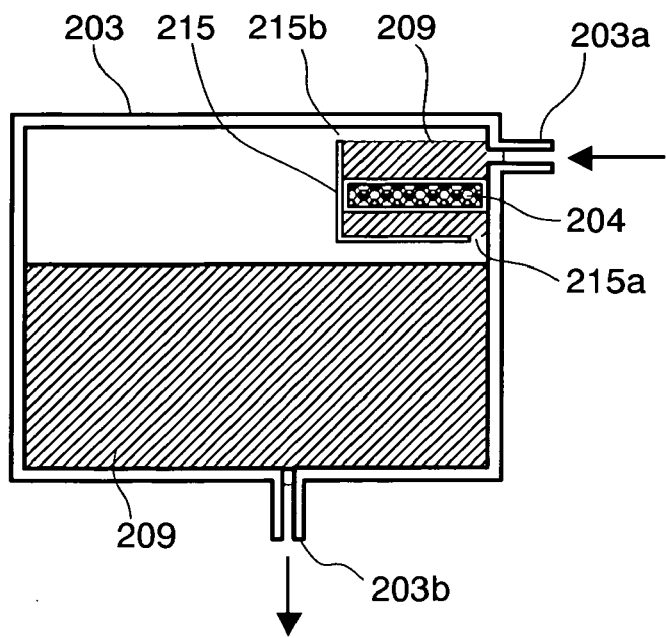
Figure 17:
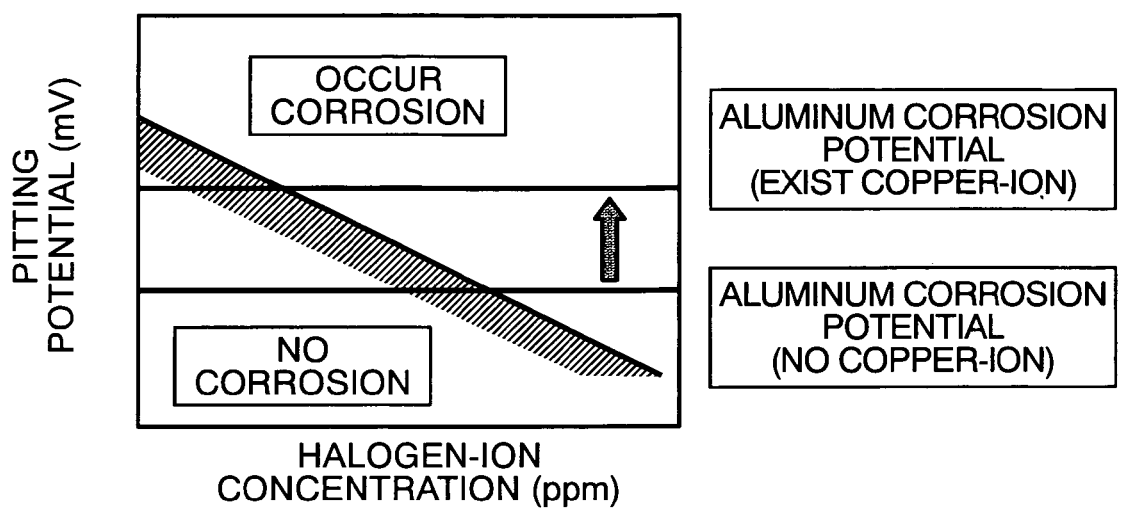
Figure 18:
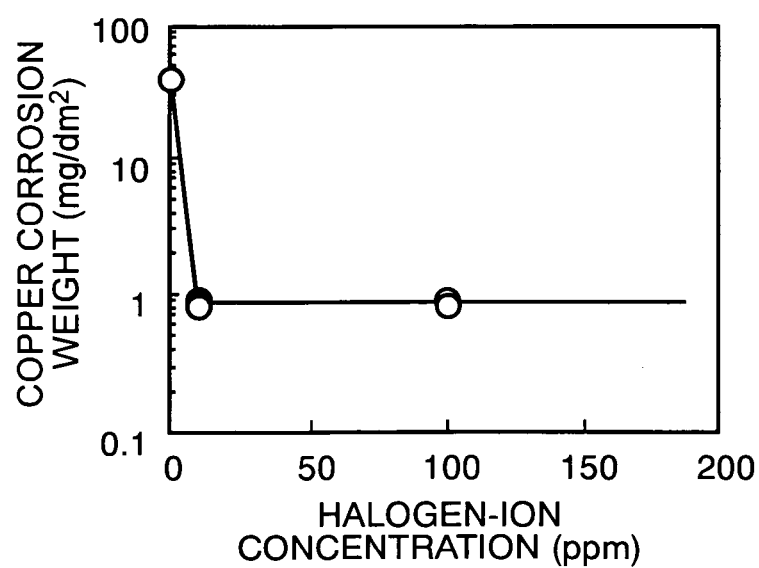
Figure 19:
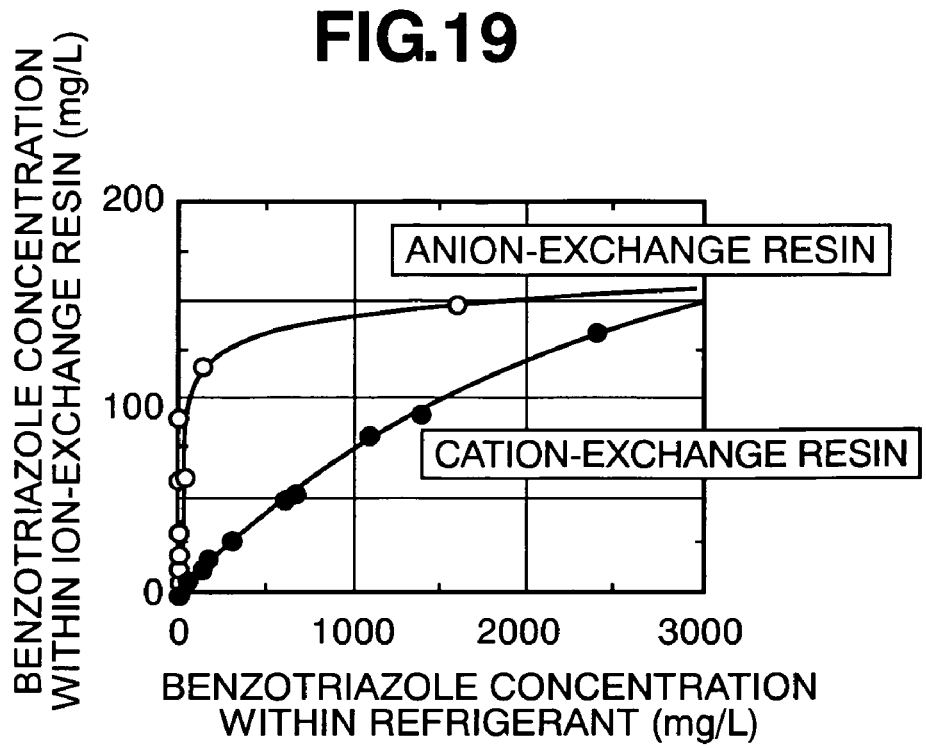
Figure 20:
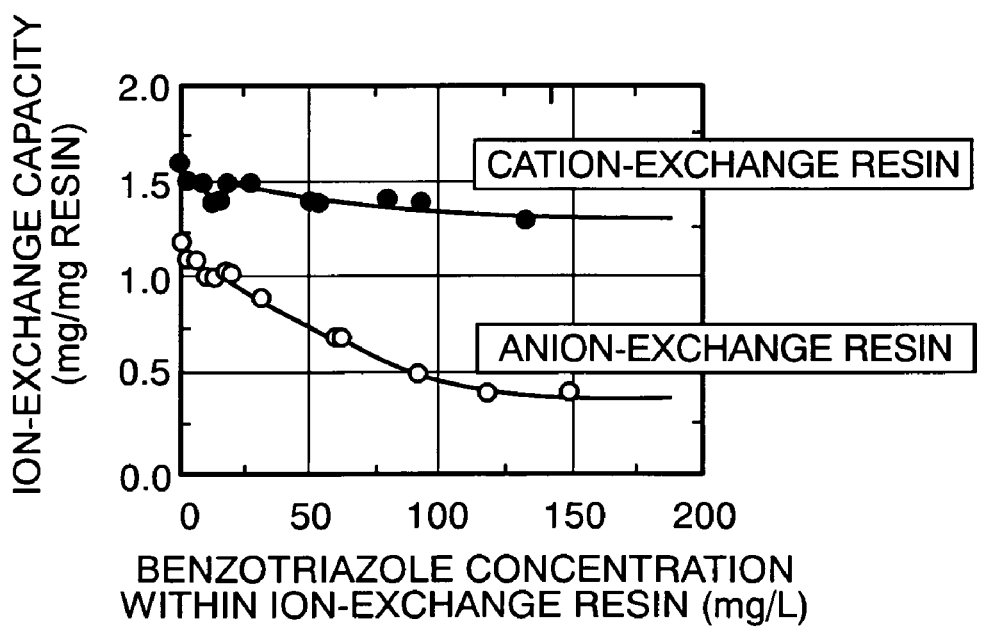
Figure 23:
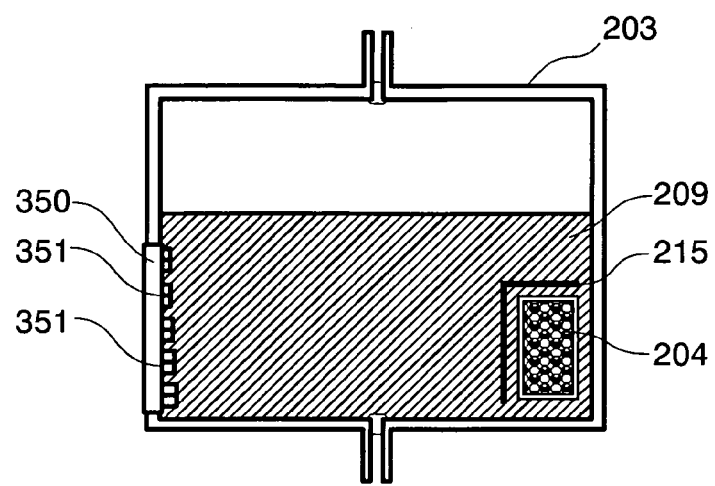
Figure 23:
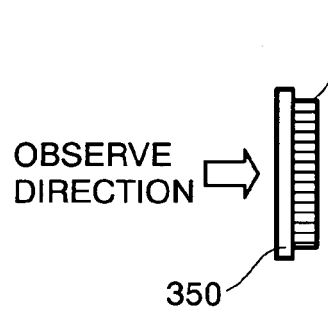
Figure 23:
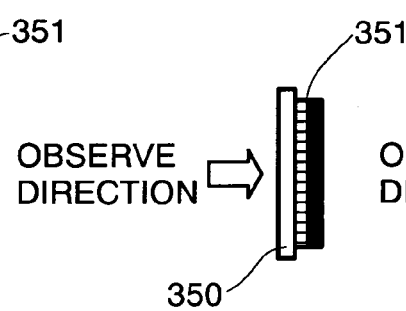
Figure 23:
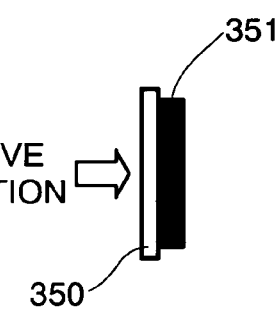

FIGS. 3(a) through 3(d) are views for showing operation of an anti-corrosive agent, which is enclosed within a microcapsule;

FIG. 4 is a view for showing a water-permeable bag for receiving the microcapsules, within each of which the anti-corrosive agent is enclosed (Embodiment 1), according to the present invention;

FIG. 5 is a view for showing the structure of a tank applying the water-permeable bag receiving the microcapsules therein (Embodiment 2);

FIG. 6 is a view for showing the water-permeable bag receiving the microcapsules therein, according to the present invention (Embodiment 3);

FIG. 7 is a view for showing the water-permeable bag receiving the microcapsules therein, according to the present invention (Embodiment 4);

FIG. 8 is a view for showing a microcapsule holder having the water-permeable bag, according to the present invention (Embodiment 5);

FIG. 9 is a view for showing the structure of a tank applying the microcapsule holder shown in FIG. 8 mentioned above (Embodiment 5);

FIG. 10 is a view for showing other microcapsule holder, according to the present invention (Embodiment 6);

FIG. 11 is a view for showing further other microcapsule holder, according to the present invention (Embodiment 7);

FIG. 12 is a view for showing a piping structure, applying the microcapsule holder therein, according to the present invention (Embodiment 8);

FIG. 13 is a view for showing other piping structure, applying the microcapsule holder therein, according to the present invention (Embodiment 9);

FIG. 14 is a view for showing other piping structure, applying the microcapsule holder therein, according to the present invention (Embodiment 10);

FIG. 15 is a view for showing the structure of a tank applying a water-permeable bag and a partition plate therein, according to the present invention (Embodiment 11);

FIG. 16 is a view for showing a variation of the tank structure shown in FIG. 15 mentioned above (Embodiment 12);

FIG. 17 is a graph for showing a relationship between a hole-corrosion generating potential and a halogen ion concentration;

FIG. 18 is a graph for showing a relationship between a copper-corrosion weight and a benzotriazole concentration within refrigerant;

FIG. 19 is a graph for showing a relationship between the benzotriazole concentration within ion-exchange resin and the benzotriazole concentration within refrigerant;

FIG. 20 is a graph for showing a relationship between an ion-exchange capacity and the benzotriazole concentration within ion-exchange resin;

FIG. 21 is view for explaining a corrosion sensor within the liquid cooling system, according to further other embodiment of the present invention;

FIGS. 22(a) and 22(b) are views for explaining the principle of the corrosion sensor shown in FIG. 21 mentioned above;

FIG. 23 is a view for explaining other embodiment of the corrosion sensor mentioned above; and FIGS. 24(a) to 24(c) are views for explaining the principle of the corrosion sensor shown in FIG. 23 mentioned above.

DETAILED DESCRIPTION OF THE INVENTION

Hereinafter, embodiments according to the present invention will be fully explained by referring to the attached drawings.

Figure 1:
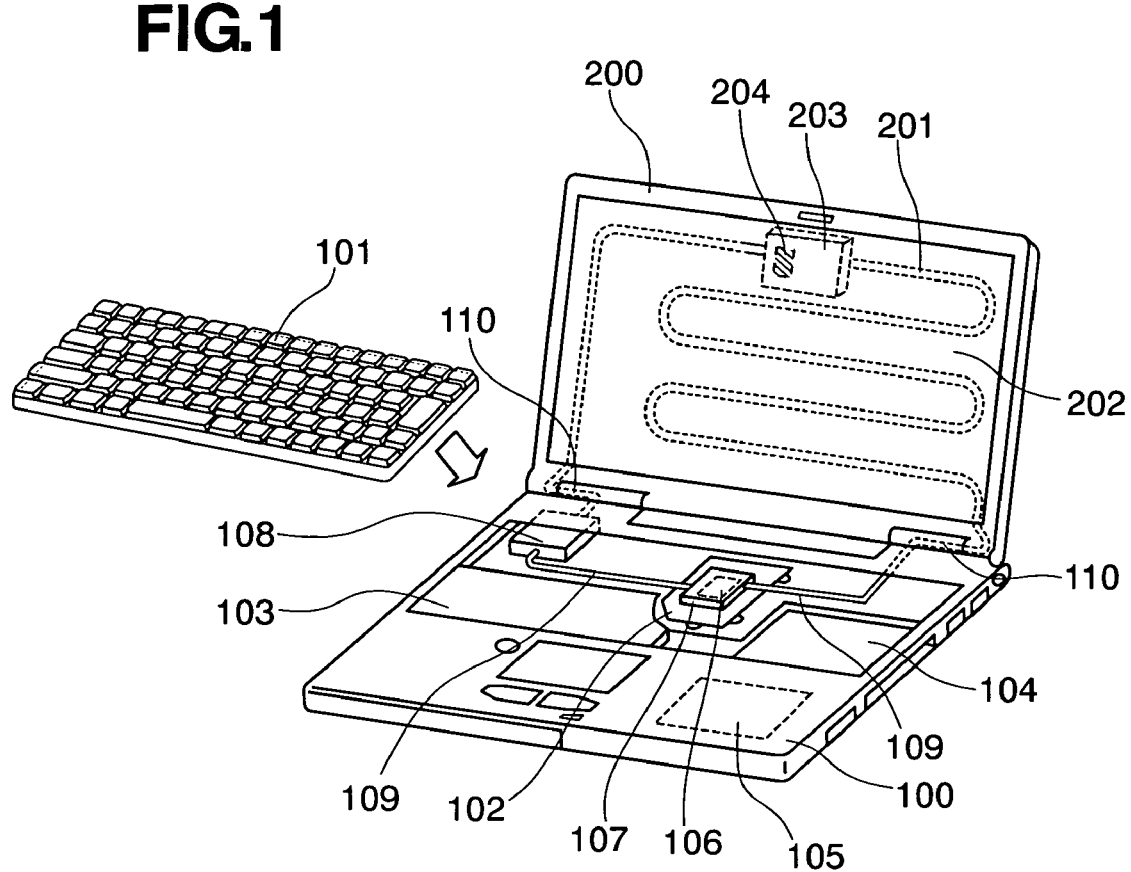
FIG. 1 is a perspective view of a notebook-type personal computer, into which a cooling system according to the present invention is applied.

First of all, FIG. 1 attached herewith is a perspective view of a notebook-type personal computer, as being an electronic apparatus applying a liquid cooling system therein, according to one embodiment of the present invention. Herein, though explanation will be made only about the notebook-type personal computer, as being the most familiar one thereof, as one embodiment thereof; however, it is needless to say that the present invention should not be restricted only to such the notebook-type personal computer, but it is also applicable to various kinds of the electronic apparatuses, such as, the desktop-type personal computer, the home server, the projector, and the media storage, etc., for example, as was mentioned above.

The electronic apparatus comprises a main housing 100, and a display housing 200 having a liquid crystal display device therein, for example, and as is shown in the figure, within the main housing 100 are provided a keyboard 101, a printed circuit board 102 maintaining plural numbers of elements thereon, a hard disk drive 103 as a memory device, a floppy disk drive (a trademark) or a CD drive 104, for example, as an auxiliary memory device, and further a battery 105, and so on. Also, on the printed circuit board 102 is mounted a semiconductor element, such as, a central processing unit 106 (hereinafter, being described by a "CPU") or the like, having a large heat-generation power or value, in particular, and upon the upper surface of the CPU 106 as being a heat-generation element, there is connected so-called a heat-receiving jacket 107, within which a flow path or channel is formed for a cooling liquid. Thus, in contact with the upper surface thereof, the lower surface of that heat-receiving jacket 107 is thermally connected with the CPU main body, through a soft heat-conduction material (such as, the mixture mixing up a filler of aluminum oxide or the like, having superior heat-conductivity, into Si grease, for example). Also, in that main housing 100, there is further provided a pump 108 for driving the cooling liquid, calculatingly.

On the other hand, onto the main housing 100 mentioned above is attached the display housing 200 through a hinge mechanism, etc., so that it can be opened or closed thereto, and further, on the rear-side surface of that display panel (i.e., the liquid crystal, etc.) is connected a heat-radiation pipe 201, zigzagging upon a heat-radiation plate 202 of made of metal, for the purpose of achieving heat-exchange between an outside air of said apparatus. Also, on the way thereof is provided a tank 203 for accumulating the cooling liquid in an inside thereof. Namely, as is apparent from the figure, the pump 108, the heat-receiving jacket 107, the heat-radiation pipe 201, and the tank 203 are connected with one another, in a manner of closed-loop, through connector pipes 109, which are mainly made of a metal, such as, copper or the like, thereby building up the liquid cooling system mentioned above. Further, as the cooling liquid to be filled up within those, for example, a pure water is applied to, and also, in addition to that pure water is mixed an anti-freezing liquid, such as, propylene glycol or the like, to be applied into, in particular, when the apparatus is exposed or used under the below-zero temperature environment. Also, a reference numeral 110 in the figure depicts a tube, which is made of an elastic material, such as, rubber, etc., for example, that is provided between the display housing 200, being attached with the main housing 100 through the hinge mechanism to be opened/closed freely thereto.

Figure 2:
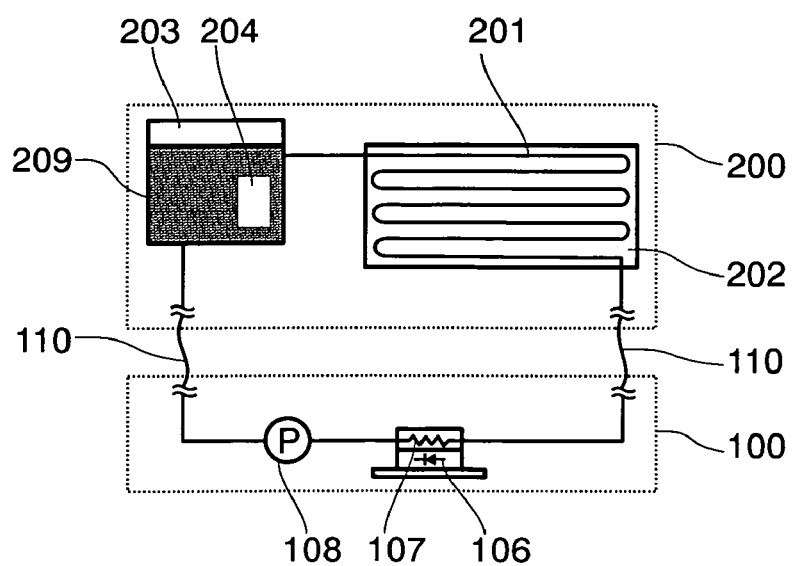
FIG. 2 is a block diagram of the notebook-type personal computer, into which the cooling system according to the present invention is applied.

Next, FIG. 2 attached herewith shows a one structure of the liquid cooling system of the notebook-type personal computer shown in FIG. 1 mentioned above. In this FIG. 2, there is shown a bag (a bag of paper or cloth) for an anti-corrosion agent by a reference numeral 204, which is provided within the tank 203. Further within an inside of that bag 204 are received microcapsules, each enclosing the corrosion inhibitor therein, as will be also explained later, and the bag 204 has water permeability. Moreover, for suppressing or lowering the heat degradation of the corrosion inhibitor down to the minimum, it is preferable that this water-permeable bag 204 is located within an inside of the radiator where the liquid coolant is low in the temperature thereof, or alternatively within the constituent members of the liquid cooling system in the downstream thereof, which are positioned but in the upstream of the heat-receiving jacket 107 mentioned above.

Figure 3A:
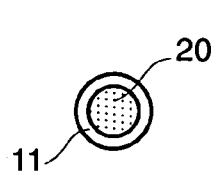
Figure 3B:
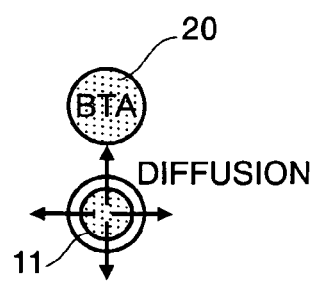
Figure 3D:
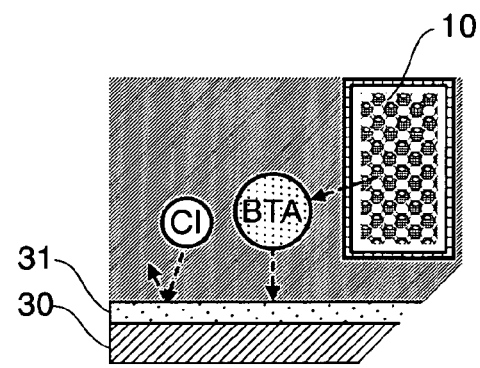
Figure 3C:

In this manner, according to the present invention, there is applied a so-called dipping or immersion-type of the bag 204, receiving the microcapsules within an inside thereof, each enclosing the corrosion inhibitor therein; thereby, diffusing or spreading the microcapsules within the cooling liquid. This microcapsule 10, as shown in FIG. 3(a), is made up with a wall material 11 being about sphere-like on an outer configuration thereof, having a diameter from several-tens μm to several-hundreds μm in the sizes thereof, and as shown in FIG. 3(b), it achieve a function of diffusing the corrosion inhibitor 20 enclosed within an inner space thereof through the wall material 11, and also discharging it into the outside, slowly or gradually for a long time-period. Or, as is shown in FIG. 3(c), it is also possible to apply a microcapsule, being made of only from a porous material having a spherical shape having the diameter of several-tens μm to several-hundreds μm in the sizes thereof. With using this, it is also possible to obtain the function of diffusing the corrosion inhibitor absorbed within the porous material, thereby discharging it into the outside, slowly or gradually for a long time-period. Further, as the corrosion inhibitor to be enclosed within the inside of the microcapsule 10, the followings can be listed up; i.e., the derivatives of benzotriazole (BTA), such as, benzotriazole, tolyltriazole, etc., for example, in particular, being the most effective one for protecting copper from the corrosion thereof. Or, as the most effective one for protecting aluminum from the corrosion thereof, there can be listed up an either one of phosphoric acid, boric acid, silica acid, benzoic acid, or a salt thereof, or a mixture of mixing up plural numbers thereof. And, as is shown in FIG. 3(d), the corrosion inhibitor 20 discharged gradually from the microcapsule absorbs on the surface of the metal 30 within the liquid cooling system in the electronic apparatus mentioned above, so as to build up or form an anti-corrosion film 31, thereby protecting said metal portions from the corrosion due to chloride ion, for example. Also, such the corrosive ions can liquate or elute from an organic material, which is used in the pump 108, the tank 203, and the flexible tube 110, etc. Further, a reference numeral 209 in the figure depicts the liquid coolant or refrigerant (i.e., the cooling liquid) accumulated within the tank 203 mentioned above.

Moreover, with such the microcapsules as was mentioned above, it is also possible to maintain the function of diffusing/discharging the corrosion inhibitors into the cooling liquid, for the time-period of guarantee of the apparatus, through adjusting the thickness of the porous material thereof (i.e., the wall material), appropriately (in details, mixing up those from one having a thick wall material to other one having a thin wall material, appropriately), thereby maintain the corrosion inhibitors in the cooling liquid within a desired value thereof, irrespective of elapse of times.

<Embodiment 1>

As was explained in the above, if the water-permeable bag 204 is put into the tank 203 mentioned above, for example, which receives the microcapsules, each enclosing the corrosion inhibitor therein (see FIG. 4), almost of the cooling liquid circulating within the liquid cooling system can pass through that water-permeable bag 204; then, the microcapsules diffuse or spread into the cooling liquid, and also the corrosion inhibitor is discharged from the microcapsules, gradually, which is enclosed within the microcapsule, and therefore it is effective for suppressing or inhibiting the metal portions from the corrosion, for a long time-period. However, if only putting it into the tank 203, then the water-permeable bag 204 floats on the surface of the cooling liquid accumulated within the tank 203 due to the specific gravity thereof. Therefore, it is preferable that the water-permeable bag 204 is fixed at a predetermined portion or position within the tank 203 mentioned above; i.e., at the such position that it is always dipped or immersed within the cooling liquid circulating.

The water-permeable bag 204 is sealed through the heat welding or the like, as was mentioned above, however, this water-permeable bag is made of a mesh or a non-woven fabric, upon which water-permeable treatment is conducted; therefore, the cooling liquid can enter into the inside of the bag, quickly. With this, an air layer cannot be formed or stay within the bag; i.e., it is possible to prevent the bag from floating, therefore it can be settled down. Also, an amount of the corrosion inhibitor to be enclosed within the microcapsule, which is filled within that water-permeable bag 204, is determined by tanking the above-mentioned time-period of guarantee for the apparatus, etc., for example.

<Embodiment 2>

Next, FIG. 5 attached herewith is a view for showing the condition where the water-permeable bag is set at the predetermined position within the tank. In this FIG. 5, around the water-permeable bag 204 is provided a partition wall 215. With such the structure, even when the air layer is formed therein, the water-permeable bag 204 will not float upwards, so that it is possible to discharge the corrosion inhibitor enclosed within the microcapsules into the cooling liquid, with certainty. With provision of the partition wall 215, in particular, at the central portion of the tank 203, it is also possible to hold the water-permeable bag 204 to be always dipped or immersed into the cooling liquid. For this reason, the microcapsules within the cooling liquid, each enclosing the corrosion inhibitor therein, can pass through the water-permeable bag 204 together with the cooling water, to be transferred into the entire of the cooling system, and therefore it is the structure being suitable or preferable, in particular, to the liquid cooling system to be applied into the notebook-type personal computer having portability.

<Embodiment 3>

FIG. 6 attached herewith is a view for further showing other embodiment of the water-permeable bag 204 mentioned above. In this FIG. 6, the water-permeable bag 204 has fixing holes 207, and it is fixed at the predetermined position within the tank 105, with using those holes 207. With such embodiment, the bag will not float on even in the case where the water-permeability of the bag is low so that the air-layer can be formed easily or stay within the bag, because of fixing with using those fixing holes 207, and it can be held within the cooling liquid, with certainty. For this reason, the microcapsules contained or received within the water-permeable bag 204 can pass through the water-permeable bag together with the cooling liquid, thereby to be diffused into the entire of the cooling system.

<Embodiment 4>

FIG. 7 attached herewith is a view for showing further other embodiment of the water-permeable bag 204 mentioned above, and the water-permeable bag 204 shown in this FIG. 7 has an anti-floating weight 208. With this embodiment, also the bag will not float on even in the case where the water-permeability of the water-permeable bag 206 is so low that the air-layer can be formed easily or stay within the bag, and then it can be held within the cooling liquid, with certainty. Further, in such the case where the water-permeable bag 206 is used while attaching the anti-floating weight 208 thereon, in this manner, then it is possible to keep the water-permeable bag 204 to be dipped within the cooling liquid, always, even if the cooling system is used in any posture thereof. Therefore, the microcapsules within the water-permeable bag can pass through the water-permeable bag together with the cooling liquid, to be diffused into the entire of the liquid cooling system. Accordingly, it is advantageous for the notebook-type personal computer. Also, in particular, in case of making tank 203 from a metal having the magnetism, then the weight 208 can be easily attached thereon if it is made from a permanent magnet, for example.

<Embodiment 5>

Further, FIGS. 8 and 9 attached herewith are views for showing an example of a holder 210, which receives the water-permeable bag 206 within an inside thereof. In this FIG. 8, the corrosion inhibitor holder 210 is made up with the water-permeable bag 204 and a part 211 for holding the bag 204 within an inside thereof, which are formed in one body together with a part 212 to be fixed onto a cooling element or part, such as, the tank 203, for example. Further, in the present embodiment, the part 211 for holding the water-permeable bag 204 within an inside thereof is made up with a metal-made mesh, on the other hand, the fixing part 212 is formed to be a flange, for example. With such the structure, as is shown in FIG. 9, the water-permeable bag 203 can be fixed by means of the flange 212 from an upper surface of the tank 203, under the condition that it is dipped or immersed into the liquid coolant accumulated therein. Furthermore, it is preferable that this flange 212 is sealed hermetically, with using packing, such as, an O-ring, etc., for example.

Also, with such the structure as was mentioned above, it is possible to obtain an advantage that the corrosion inhibitor holder 210 can be exchanged, easily, with a new water-permeable bag 204 containing the microcapsules therein, when an amount of the microcapsules received therein comes down. Further, with using the corrosion inhibitor holder 210, commonly to be a supply inlet of the cooling liquid into the tank, there can be achieved an advantage that the cooling liquid can be easily supplied into the inside of the tank 203, while removing the corrosion inhibitor holder 210 from the tank.

In addition thereto, in the above-mentioned FIG. 9 showing the example of installing the anti-corrosion agent holder 210 within the tank 203, for example, if the corrosion inhibitor holder 210 is positioned in the vicinity of the center of the tank 203 (as is shown by broken lines in the figure), the water-permeable bag 204 can be held to be dipped or immersed into the cooling liquid, with certainty, even if the cooling system is used in any posture thereof. For this reason, the microcapsules within the water-permeable bag 204 can pass through the water-permeable bag together with the cooling water, thereby to be diffused or spread into the entire of the liquid cooling system.

<Embodiment 6>

Further, FIG. 10 attached herewith is a view for showing other embodiment of the corrosion inhibitor holder 210 shown in FIGS. 8 and 9 mentioned above. First, in FIG. 10, further, the water-permeable bag 206 attached with the anti-floating weight 213 thereon is fixed while using the fixing holes 207 formed in a part of the bag, through a fixing part 214, such as, a hook or the like, for example, which is formed on the flange 212 mentioned above. However, the water-permeable bag 204 has flexibility, and then this water-permeable bag can be held under the condition that it is dipped into the cooling liquid, even if the cooling system is used in any posture thereof. For this reason, the microcapsules within the water-permeable bag can pass through the water-permeable bag together with the cooling liquid, thereby to be diffused or spread into the entire of the liquid cooling system.

<Embodiment 7>

Further, FIG. 11 attached herewith shows further other embodiment of the corrosion inhibitor holder 210. With the example shown in this FIG. 11, differing from that shown in the above, a plural number of pieces of water-permeable bags 204 are used therein, each being thin in the shape thereof, thereby increasing up the areas contacting between the microcapsules and the cooling liquid. For this reason, with such the structure, there can be achieved an effect that the microcapsules enclosing the corrosion inhibitor therein can be discharged into the cooling water, even in an early time-period. In a case there is a necessity of discharging the microcapsules enclosing the corrosion inhibitor therein into the cooling liquid in the early time-period, in this manner, those ion exchange bags are used in the plural number of pieces thereof, each being thin in the shape, as was mentioned above, or alternately, outer peripheries thereof are formed to be bellows-like in the shape thereof, although not shown in the figure; thereby, enabling to increase the contacting areas between the microcapsules and the cooling liquid within the water-permeable bag 204, i.e., being effective for discharging/diffusion of the corrosion inhibitor in the early time-period.

<Embodiment 8>

In addition thereto, FIG. 12 attached herewith is a view for showing an embodiment, wherein the anti-corrosion agent holder 210 mentioned above is inserted into an inside of a vessel or container 220 having a connector opening in a part thereof. In this FIG. 12, the corrosion inhibitor agent holder 210 is made up with a part 211 of the mesh of metal-made, for example, and it is held within an inside of a container 190 having connector openings 191 and 191 to the pipes mentioned above. With such the structure, the corrosion inhibitor holder 210 does not disturb the flow of the cooling liquid within the flow path; therefore, it is almost possible to neglect the pressure loss due to provision of the corrosion inhibitor holder 210. Also, such the corrosion inhibitor holder 210 can be exchanged with a new bag 204, easily, in particular, when an amount of the microcapsules goes down, which encloses the corrosion inhibitor therein.

<Embodiment 9>

Further, FIG. 13 attached herewith a view for explaining an embodiment, wherein the corrosion inhibitor holder 210 mentioned above and a container 190' having the connector openings 191 and 191 with the pipes, are formed into one body. Namely, in the case there is no necessity of exchanging the water-permeable bag 204, it is possible to form the corrosion inhibitor holder 210 together with the container 190' having the connector openings with the pipes can be formed into one body, as is the embodiment shown in this FIG. 13. The corrosion inhibitor holder 210 having such the structure can be positioned in an upstream side of a member that must be inhibited from the corrosion thereupon, in particular, such as, the heat-receiving jacket, for example, thereby enabling the diffusion of the corrosion inhibitor enclosed within the microcapsules to be diffused; therefore, the effect thereof is large.

<Embodiment 10>

FIG. 14 attached herewith shows an example of the structure, building up the corrosion inhibitor holder 210 with using a part of the pipe 20 (for example, the reference numeral 109 in FIG. 1), and in the figure, fine bores 21 are formed in a part of the pipe 20, around which a cover 22 is attached with, thereby forming a container for containing or receiving the water-permeable bag 204 within an inside thereof. Such the structure can be manufactured, easily, through the drawing process, etc., and then it is the structure being advantageous for achieving a low-cost, in particular.

<Embodiment 11>

FIG. 15 attached herewith is a view for showing an example, in which the water-permeable bag 204 is provided, in particular, in the vicinity of an inflow opening 203a for the liquid coolant of the structure within an inside of the tank 203. In this FIG. 15, around the water-permeable bag 204 is provided a partition wall 215. The cooling liquid flows into the tank 203 from the inflow opening 203a, to be accumulated within an inside of the partition plate 215, temporarily. Thereafter, the cooling liquid 209 accumulated within the partition plate 215 drips down, gradually, from a drip hole 215a of the partition plate, which is opened in a lower side thereof. Due to the flow of the cooling liquid that drips down, the microcapsules within the water-permeable bag 204 is discharged into the cooling liquid, so as to be diffused or spread into the entire of the cooling system, effectively. However, if a flow amount is large of the circulation cooling liquid, then the cooling liquid running into the tank 203 overflows from an overflow opening of the partition plate shown in the figure.

<Embodiment 12>

FIG. 16 attached herewith shows an example, where the drip hole 215a of the partition plate 215 and the water-permeable bag 204 are disposed in series, in the embodiment shown in FIG. 15 mentioned above. Namely, in this FIG. 16, with using the head of liquid of the cooling liquid accumulated within the partition plate 215, it is possible to allow the cooling liquid to pass through within the water-permeable bag 204, thereby enabling to discharge the microcapsules into the cooling liquid, much more effectively. With such the dripping method, the effect is remarkable as the head of liquid comes to be high.

In the embodiments relating to the water-permeable bag and the corrosion inhibitor holder, the details of which are mentioned in the above, description was made, mainly on the examples of applying into the notebook-type personal computer; however, the present invention should not be restricted only to that, but is also applicable to the various kinds of electronic apparatuses, such as, the desktop-type personal computer, the projector, the media storage, the server, etc., other than that.

Following to the above, detailed explanation will be given, hereinafter, about an electronic apparatus applying the cooling system therein, according to other embodiment of the present invention.

As was mentioned in the above, the microcapsules enclosing the corrosion inhibitor therein, which is contained or received within the water-permeable bag 204 or the corrosion inhibitor holder 210, can be easily broken, in particular, the wall material thereof under high temperature. For this reason, it is preferable that water-permeable bag or the corrosion inhibitor holder is located at the position where the temperature is lowest in that system; such as, at a front or foregoing stage of the pump, for example. Further, the water-permeable bag 204 or the corrosion inhibitor holder 210 can be formed into a one body with the tank 203 or the pump 108.

Further, in the mentioned above, though the corrosion inhibitor is enclosed within the microcapsules, and those microcapsules are contained or received within the water-permeable bag 204, thereby to be disposed in a part of the flow path of the liquid coolant within the cooling system, but further, it is also possible to apply an ion exchange resin therein. Hereinafter, explanation will be given in more details about this.

By the way, with such as, a CPU 107 of high heat-generation, having a value of heat-radiation exceeding 30 W, for example, there is required that a heat-receiving jacket and/or a heat-exchanger (i.e., a radiator) have high cooling performance thereof, in particular. In general, it is possible for the heat-receiving jacket mentioned above to have a large heat-conduction area, through forming a fine fin structure in the flow path within an inside thereof, thereby to improve the cooling performance thereof. For making up such the fin structure, the die-casting is preferable, in particular, from a viewpoint of the performances obtainable therefrom, the cost and the productivity thereof, etc. Also, as a material to be used in that instance, aluminum is used in many cases. On the other hand, the heat-exchanger (i.e., radiator) can be improved on the ability or performance of heat-conduction, through attaching heat-radiation fins (of aluminum) on an outside of the heat-conduction pipe thereof. Further, for obtaining the connection between the heat-conduction pipe and the heat-radiation fins, but on the other hand, it is preferable to adopt the process of pipe-expanding, in particular, from a viewpoint of the cost and the productivity, and mainly copper is used as the material thereof. Furthermore, comparing to copper, stainless steel is superior thereto in the anti-corrosion characteristic, but is inferior in the heat-conduction. And, further it is high in the hardness or stiffness; therefore, it is difficult to apply such the process of pipe-expanding thereon. Accordingly, in particular, within the cooling system having such the large value of heat-generation, aluminum is inevitable or inescapable material for making up heat-receiving jacket, as well as, copper for the heat-radiation pipe and the heat-exchanger, in the structure thereof.

In a case off coexistence of aluminum and copper together, in this manner, however there is a problem that copper ions dissolved from copper remarkably promote pitting corrosion of aluminum. This is shown in FIG. 17 attached herewith, by referring to a relationship between the pitting potential of aluminum and the concentration of halogen ions (for example, chloride ion, bromide ion, etc.) contained within the liquid coolant or refrigerant.

Namely, with aluminum, the pitting-corrosion generates when the corrosion potential (i.e., the potential when dipping aluminum into the liquid coolant or refrigerant) comes to be noble (i.e., on a side of plus potential) more than the pitting potential. In particular, in a system where copper ions coexist therewith in the liquid coolant or refrigerant, since the copper ions are restored or deoxidized on the surface of aluminum, therefore, the potential of aluminum is shifted into the noble side (i.e., the plus potential side). For this reason, the pitting-corrosion can be generated, easily on aluminum. In addition thereof, in particular, when applying the connector tubes made of one of the organic materials in apart of the pipes, for the purpose of achieving small-sizing of the cooling system, or for achieving easy assembling thereof, the halogen ions (for example, chloride ion, bromide ion, etc.) dissolve from those connector tubes into the coolant liquid. And, as is apparent from FIG. 17 mentioned above, the pitting potential of aluminum shifts into the less noble side (i.e., the minus potential side) in accordance with an increase of the halogen ions within the liquid coolant or refrigerant. Thus, the dissolution of the halogen ions from the organic material promotes the pitting-corrosion of aluminum, remarkably.

Then, within the liquid cooling system to be applied into the various kinds of electronic apparatuses, such as, the notebook-type personal computer, etc., in particular, within the electronic apparatus having the semiconductor device of such the high heat-generation, wherein it is essential to apply therein such the heat-receiving jacket made of aluminum and the heat-radiation pipe and/or the heat-exchanger (i.e., the radiator) made of copper, it is effective to suppress the dissolution of the copper ions from the heat-radiation pipes and/or the heat-exchanger, and further to remove the halogen ions dissolved from the pipes and so on, which are made of the organic material, building up a part of the piping thereof, for the purpose of suppressing or inhibiting the heat-receiving jacket made of aluminum, as was mentioned above, from the pitting-corrosion thereon.

By the way, in general, according to the conventional art, the corrosion inhibitors for aluminum and copper are added into the cooling liquid; i.e., the dissolution of copper ion can be suppressed due to the function of the corrosion inhibitor for copper, and further the pitting-corrosion of aluminum can be suppressed due to the function of the corrosion inhibitor for aluminum. However, if the liquid cooling system is operated for a long time-period, without maintenance thereupon (i.e., under the condition of so-called maintenance-free), like such the electronic apparatus as mentioned above, there is a fair that the corrosion resistance is lowered due to consumption of the corrosion inhibitors within the liquid cooling system.

For such the reason, a demand is made upon the liquid cooling system, in particular, enabling to maintain the corrosion resistance, irrespective of the operation for such the long time-period, and then, according to the present invention, it is preferable to use the an ion exchanger made of ion exchange resin in combination with the corrosion inhibitor for materials of the copper group. Namely, with this, attention is paid onto the copper ion and the halogen ion, which are main factors of the pitting-corrosion of aluminum, and in particular, there is provided a means for inhibiting the copper ion from dissolution into the cooling liquid, while catching up the halogen ion. This is also due to the fact that there is no definite or decisive material to be used as the corrosion inhibitor for aluminum, but on the contrary to this, there is a material among the corrosion inhibitor for copper, which has tremendous effects as that anti-corrosion agent for copper. In this manner, with the present embodiment, it has the feature in an aspect that the pitting-corrosion can be suppressed or inhibited upon aluminum, effectively, for a long time-period, but without applying the corrosion inhibitor for aluminum or with applying it in combination therewith. In particular, in the case where it is applied together with the ion exchanger, the copper ion dissolving from the heat-radiation pipe and the heat-exchanger made of copper can be caught within that ion-exchanger; therefore, also with this, the corrosion resistance of the heat-receiving jacket made of aluminum is further improved.

In more details thereof, as the corrosion inhibitor for copper is effective a derivative of benzotriazole, such as, including benzotriazole, tolyltriazole, etc., for example. In FIG. 18 attached herewith, there is shown a relationship between an amount of corrosion of copper and a concentration of benzotriazole within the liquid of coolant or refrigerant. From this relationship, it is apparent that, the corrosion of copper can be suppressed down to ⅟₅₀ if 10 ppm or more of benzotriazole is added therein, and at the same time, also the dissolution of copper ions can be suppressed down to ⅟₅₀. Hereinafter, description will be made about the case where benzotriazole is added at 50 ppm, by taking the safety ratio thereof into the consideration.

FIG. 19 shows a relationship between the concentration of benzotriazole within the ion-exchanger resin and the concentration of benzotriazole within the coolant or refrigerant. Since benzotriazol is ionized a little bit to generates a hydroxyl (OH) radical, it shows a weak alkaline character. For this reason, it is mainly absorbed onto an anion-exchanging resin. In the vicinity of the concentration of benzotriazole at 50 ppm, the adsorption (i.e., reversible absorption) onto the anion-exchanging resin increases, abruptly. For this reason, if the benzotriazole within the liquid of coolant or refrigerant is consumed, since benzotriazole is discharged from the microcapsules, which are supplied from the water-permeable bag 204 mentioned above, therefore the concentration of benzotriazol within the liquid coolant or refrigerant can be maintained at constant.

FIG. 20 shows a relationship between capacity of ion-exchanger (i.e., the capacity of adsorbing ions) and the concentration of benzotriazole within the ion-exchange resin. However, in the case where benzotriazole exists within the liquid coolant or refrigerant, at the preset concentration 50 ppm, judging from FIG. 19 mentioned above, the benzotriazole concentration within the ion-exchange resin is 80 mg/mg resin (i.e., benzotriazole concentration per 1 mg of the ion exchange resin) for the anion exchange resin, while it is 10 mg/mg resin for the cation exchange resin. In the case when the benzotriazole mentioned above is adsorbed onto the ion exchange resin, then from FIG. 20, the anion exchange resin is 60% while 10% for the cation exchange resin; i.e., the ion-exchange capacity goes down. Further, when the benzotriazole is adsorbed onto the ion exchange resin, in the similar manner, it is possible to adsorb the halogen ions, being the anions, sufficiently. Further, by bringing the ratio of the anion exchange resin to be larger than that of the cation exchange resin, in comparison therewith, it is also possible to adsorb the copper ions, sufficiently.

From the above, with using the ion exchange resin in an amount thereof, being sufficient for adsorbing the halogen ions dissolved from the connector tubes made of the organic material, as well as, the copper ions dissolved from the heat-radiation pipe made of copper, in combination with the water-permeable bag 204, which receives the microcapsules therein, for maintaining the benzotriazole concentration within the liquid coolant or refrigerant, it is possible to maintain the corrosion resistance, for a long time-period, within the liquid cooling system.

Hereinafter, there will be shown an embodiment, being attached with a corrosion sensor in a part thereof, within the cooling system, according to further other embodiment of the present invention. Namely, as was mentioned above, within the various electronic apparatuses, such as, the notebook-type personal computer, etc., there is demanded the liquid cooling system, which can maintain the corrosion resistance irrespective of the operation for a long time-period. However, in such the case, it is convenient if being possible to determine the condition of the liquid coolant or refrigerant, easily, within an inside of the said liquid cooling system; i.e., on whether corrosion generates or not within the inside thereof due to the liquid coolant or refrigerant, in particular, during a maintenance operation thereon, etc., for example. Then, according to the present invention, explanation will be given about such the corrosion sensor, which is provided within the cooling system of the notebook-type personal computer, for example, as one of the embodiments mentioned above.

FIG. 21 attached herewith shows the corrosion sensor, which is attached onto the tank 105 of the cooling system, for example. Namely, within the inside of the tank 203 accumulating the liquid coolant or refrigerant therein, there is provided the ion exchange bag 9, being received within the partition plate 215, so as to be dipped into the coolant or refrigerant liquid, and also on the upper surface of the tank 203 is formed an opening portion 220. Further, on this opening portion 220 is attached a cap 221, in a detachable manner. And, at the central portion of the cap 221, there is provided a corrosion sensor 222 made from a copper rod, for example, being implanted upright, so that a portion thereof (i.e., the tip portion) is dipped into the liquid coolant or refrigerant accumulated within the tank.

With the corrosion sensor of such the structure as was mentioned above, when making a maintenance thereupon, for example, the cap 221 is removed therefrom, and then it is possible to check, visually, through eye observation, for example, on whether the corrosion inhibitor mentioned above sufficiently works and/or acts upon or not, easily, in the liquid coolant or refrigerant within the tank 203 (i.e., within the liquid cooling system). Namely, FIG. 22(*a*) shows the condition of the sensor when the corrosion inhibitor works sufficiently, wherein no corrosion is produced on the copper rod 222 attached on the cap 221, in this case, and then it shows the metal color on the entire surface thereof. On the other, in a case when the corrosion inhibitor does not work and/or act upon sufficiently, i.e., when corrosion proceeds within the liquid cooling system, then as is shown in FIG. 22(b), at the tip portion of the copper rot attached on the cap 221, in particular, at the portion dipped into the coolant liquid accumulated within the tank 203, there is produced corrosion product (i.e., rust). For this reason, a change occurs on the surface thereof, and this can be checked, visually, through the eye observation thereof. Thus, it is possible to confirm on whether the anti-corrosion works and/or acts sufficiently or not, which is added into the liquid coolant circulating within the liquid cooling system, easily.

Further, FIG. 23 attached herewith shows other corrosion sensor, although differing from the above-mentioned in the structure thereof, however being attached onto the tank 203 of the cooling system mentioned above, so that the condition of corrosion can be checked, easily, also through the eye observation from an outside thereof, visually.

This corrosion sensor, as is apparent from the figure, is attached onto a part of the wall surface of the tank 203 (in the example shown in the figure, a side surface), to be formed into one body together with the tank, and this corrosion sensor is built up with one or plural numbers of thin films 351 of copper, which is/are formed on the surface of a transparent substrate 350, for example. Further, the metal thin film(s) 351 formed on the surface of the transparent substrate 350 is formed at a predetermined thickness, into a shape of a circle, a rectangle, etc. Also, when the metal thin films 351 are formed on the surface of the transparent substrate 350 in plural number thereof, said metal thin films are formed thereon, differing in the thickness thereof.

FIG. 24 attached herewith explains the principle of the corrosion sensor, the structure of which was shown in the above, wherein the metal thin film(s) at the beginning of when filling up the liquid coolant or refrigerant into the tank 203, or when the anti-corrosion agent in the liquid coolant or refrigerant works or acts sufficiently within the tank (i.e., within the liquid cooling system), or when the corrosion does not proceed within the liquid cooling system, for example, then as shown in FIG. 24(a), the metal thin film(s) 351 mentioned above can be observed to be the metallic color when observing it/them in the direction shown by an arrow in the figure; i.e., from an outside of the transparent substrate 350 of the tank. Also, as shown in FIG. 24(b), if the corrosion proceeds due to the liquid coolant or refrigerant within the liquid cooling system, the corrosion sensor shows the metallic color when observing it from the outside thereof, in the similar manner, but the corrosion does not proceeds up to a predetermined degree (i.e., the degree where the liquid cooling system cannot be used any more, for example). Thus, if that corrosion sensor shows up the metallic color when observing it from the outside thereof, it can be determined that the corrosion due to the liquid coolant or refrigerant does not proceed so much that the liquid cooling system can be used still.

On the other hand, when the corrosion proceeds due to the liquid coolant or refrigerant within the liquid cooling system, as shown in FIG. 24(c), and if it reaches up to the predetermined degree (i.e., the degree where the liquid cooling system cannot be used any more), then the color, not such the metallic color, but of the corrosive product (i.e., the rust) can be observed on the corrosion sensor mentioned above, due to the corrosion proceeding over the entire film thickness thereof, when observing it from the outside thereof. Thus, if the color is changed from the metallic color into the color of corrosive product when observing that corrosion sensor from the outside thereof, it can be determined that the corrosion proceeds due to the liquid coolant or refrigerant within the liquid cooling system, so that the liquid cooling system cannot be used.

However, as was mentioned in the above, but not possible with the corrosion sensor having the metal thin film 351 formed to be one (1) piece, however as shown in FIG. 23, if the metal thin films 351, 351 . . . are formed in plural numbers thereof, at the respective film thicknesses different from one another (in the present example, 5 kinds); i.e., with the corrosion sensor having the plural numbers of metal thin films 351, 351 . . . formed on the transparent substrate 350, then it is possible to make determination upon the condition of the corrosion (i.e., a lifetime) within the liquid cooling system, at plural numbers of stages, with the combination thereof. For example, when the metal film 251 having the thinnest film-thickness at the uppermost portion changes from the metallic color into the color of corrosive product, it indicates a beginning or starting of the corrosion within the liquid cooling system, while indicating the degree of proceeding of corrosion accompanying with an increase of the number of the metal films 351, 351 . . . , which change into the color of corrosive product, and further when all of the metal thin films 351, 351 . . . change from the metallic color into the color of corrosive product, including the thickest metal thin film at the lowest portion, it is indicated that the said liquid cooling system reaches to the lifetime thereof; thereby, enabling to give an alarm that the cooling system must be changed over. However, in that instance, it is also possible to observe the changes of the metal thin-films 351, 351 . . . with using an optic sensor, for example, thereby to give an alarm that the liquid cooling system reaches up to the lifetime, i.e., the necessity of exchange of the cooling system, on a display portion of an equipment or an apparatus, for example. Further, although the explanation was made in the above, that the corrosion sensor is formed or provided in a part of the tank building up the liquid cooling system; however, the present invention should not be restricted only to such the structure, but it is needless to say that the corrosion sensor can be provided at any portion, other than that mentioned above, as far as it makes up a part of the liquid cooling system, through which the liquid coolant or refrigerant flows, in the similar manner to the above.

However, it would be apparent that the similar functions and/or the effects as were mentioned above can be also obtained with the structure of the further other embodiment mentioned above. And, it is apparent that other variation is also applicable, appropriately, for the person skilled in the art.

As was fully mentioned, according to the present invention, as apparent from the above, there can be obtained a superior effect of providing the liquid cooling system, and also the electronic apparatus applying the same therein, in particular, being suitable to be applied into the electronic apparatus having the heat-generation body, such as, the semiconductor element having a high value of heat-generation, being small in the sizes and thin in the thickness thereof, and enabling to protect the liquid cooling system from the corrosion for a long time-period (i.e., 5–10 years), irrespective of using the liquid coolant or refrigerant therein, thereby maintaining the function of such the heat-radiating body through effectively cooling thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A liquid cooling system for an electronic apparatus, comprising:
   a pump for driving a cooling liquid;
   a heat-receiving jacket for receiving heat from a heat-generating electronic part and for transferring the heat to the cooling liquid, which is supplied from said pump;
   a radiator being supplied with the cooling liquid from said heat-receiving jacket, for radiating the heat into an outside; and
   a flow path being provided, for circulating said cooling liquid among said radiator, said pump and said heat-receiving jacket, wherein
   a water-permeable bag-like material receiving therein microcapsules, each of which encloses an anti-corrosion agent within an inside thereof, is disposed in a part of the flow path of said cooling liquid, under condition of being in contact with said cooling liquid.

2. The liquid cooling system for an electronic apparatus, as described in the claim 1, wherein said microcapsules has a diameter from several-tens μm to several-hundreds μm.

3. The liquid cooling system for an electronic apparatus, as described in the claim 1, wherein those members building up said liquid cooling system are made of either one of copper and aluminum, and said anti-corrosion agent is an anti-corrosion agent of copper.

4. The liquid cooling system for an electronic apparatus, as described in the claim 3, wherein said anti-corrosion agent of copper is a derivative of benzotriazol.

5. The liquid cooling system for an electronic apparatus, as described in the claim 1, wherein those members building up said liquid cooling system are made of either one of copper and aluminum, and said anti-corrosion agent is an anti-corrosion agent of aluminum.

6. The liquid cooling system for an electronic apparatus, as described in the claim 3, wherein said anti-corrosion agent of aluminum includes either one of phosphoric acid, boracic acid, silicic acid, benzoic acid, and a salt thereof.

7. The liquid cooling system for an electronic apparatus, as described in the claim 1, further comprising a corrosion sensor for detecting a condition of corrosion due to said cooling liquid within said liquid cooling system.

8. The liquid cooling system for an electronic apparatus, as described in the claim 7, further comprising a tank for accumulating a part of the cooling liquid circulating within said liquid cooling system in an inside thereof, and said corrosion sensor is provided in a part of said tank.

9. The liquid cooling system for an electronic apparatus, as described in the claim 1, wherein an ion-exchange resin is applied therein.

10. An electronic apparatus, comprising:
    a liquid cooling system, having:
    a pump for driving a cooling liquid;
    a heat-receiving jacket for receiving heat from a heat-generating electronic part and for transferring the heat to the cooling liquid, which is supplied from said pump;
    a radiator being supplied with the cooling liquid from said heat-receiving jacket, for radiating the heat into an outside; and
    a flow path being provided, for circulating said cooling liquid among said radiator, said pump and said heat-receiving jacket, wherein
    a water-permeable bag-like material receiving therein microcapsules, each of which encloses an anti-corrosion agent within an inside thereof, is disposed in a part of the flow path of said cooling liquid, under condition of being in contact with said cooling liquid; and
    a heat-generating semiconductor element installed within said electronic apparatus, which is attached on said heat-receiving jacket under condition of being in contact therewith.

11. The electronic apparatus, as described in the claim 10, wherein said electronic apparatus is either one of a desk-top type personal computer, a home server, a projector and a media storage.

12. The electronic apparatus, as described in the claim 10, wherein said electronic apparatus is a notebook-top type personal computer, having a main body installing said heat-generating semiconductor element within an inside thereof, and a display portion comprising a plate-type display in a part thereof, and said radiator is provided in a part of said display portion.

13. The electronic apparatus, as described in the claim 10, wherein said microcapsules has a diameter from several-tens μm to several-hundreds μm.

14. The electronic apparatus, as described in the claim 10, wherein those members building up said liquid cooling system are made of either one of copper and aluminum, and said anti-corrosion agent is an anti-corrosion agent of copper.

15. The electronic apparatus, as described in the claim 14, wherein said anti-corrosion agent of copper is a derivative of benzotriazol.

16. The electronic apparatus, as described in the claim 10, wherein those members building up said liquid cooling system are made of either one of copper and aluminum, and said anti-corrosion agent is an anti-corrosion agent of aluminum.

17. The electronic apparatus, as described in the claim 16, wherein said anti-corrosion agent of aluminum includes either one of phosphoric acid, boracic acid, silicic acid, benzoic acid, and a salt thereof.

18. The electronic apparatus, as described in the claim 10, further comprising a corrosion sensor for detecting a condition of corrosion due to said cooling liquid within said liquid cooling system.

19. The electronic apparatus, as described in the claim 18, further comprising a tank for accumulating a part of the cooling liquid circulating within said liquid cooling system in an inside thereof, and said corrosion sensor is provided in a part of said tank.

20. The electronic apparatus, as described in the claim 10, wherein an ion-exchange resin is applied therein.

* * * * *